United States Patent
Lee et al.

(10) Patent No.: US 9,407,309 B2
(45) Date of Patent: Aug. 2, 2016

(54) METHOD OF PROVIDING AMOUNT OF EXPOSURE TO ELECTROMAGNETIC WAVES AND USER TERMINAL

(71) Applicant: Electronics and Telecommunications Research Institute, Daejeon (KR)

(72) Inventors: Ae Kyoung Lee, Daejeon (KR); Hyung Do Choi, Daejeon (KR)

(73) Assignee: Electronics and Telecommunications Research Instit, Daejeon (KR)

( * ) Notice: Subject to any disclaimer, the term of this patent is extended or adjusted under 35 U.S.C. 154(b) by 0 days.

(21) Appl. No.: 14/578,801

(22) Filed: Dec. 22, 2014

(65) Prior Publication Data
US 2015/0188590 A1 Jul. 2, 2015

(30) Foreign Application Priority Data
Dec. 31, 2013 (KR) .................... 10-2013-0169145

(51) Int. Cl.
*H04B 1/3827* (2015.01)

(52) U.S. Cl.
CPC ...... *H04B 1/3838* (2013.01); *H04B 2001/3844* (2013.01)

(58) Field of Classification Search
CPC ........... G01R 29/0814; G01R 29/0892; H04B 1/3838; H04B 17/23; H04B 2001/3844
See application file for complete search history.

(56) References Cited

U.S. PATENT DOCUMENTS

| | | | | |
|---|---|---|---|---|
| 6,919,845 B2 * | 7/2005 | Ozaki | ............... | G01R 29/0814 307/149 |
| 7,610,027 B2 * | 10/2009 | Alapuranen | ........ | H04W 52/225 455/117 |
| 8,519,856 B2 * | 8/2013 | Hyde | ...................... | G08B 3/10 340/578 |
| 8,686,865 B2 * | 4/2014 | Hyde | ...................... | A61B 1/16 340/600 |
| 8,787,996 B2 * | 7/2014 | Friedlander | .......... | H04B 1/3838 455/423 |
| 2001/0027115 A1 * | 10/2001 | Zilberberg | ............. | H01Q 1/245 455/575.5 |

(Continued)

FOREIGN PATENT DOCUMENTS

| | | |
|---|---|---|
| KR | 1020050109382 A | 11/2005 |
| KR | 1020080034566 A | 4/2008 |
| KR | 1020130056021 A | 5/2013 |

OTHER PUBLICATIONS

English Translation of KR 10-2013-0056021. Hong, Seon-Ui. Printed Aug. 31, 2015.*

*Primary Examiner* — Nathan Mitchell
(74) *Attorney, Agent, or Firm* — William Park & Associates Ltd.

(57) ABSTRACT

A method of providing an amount of exposure to electromagnetic waves, and a user terminal are provided. The method may include receiving a signal of each of a plurality of wireless services, extracting a measured electric field and a reference level of electric field strength from a signal associated with each of the plurality of wireless services, and determining an exposure index of each of the plurality of wireless services, based on the measured electric field and the reference level of electric field strength, the exposure index being measured outside a body of a user.

20 Claims, 11 Drawing Sheets

(56) References Cited

U.S. PATENT DOCUMENTS

| | | | | |
|---|---|---|---|---|
| 2002/0011828 A1* | 1/2002 | Wallach | | H04B 1/3838 324/76.15 |
| 2003/0080277 A1* | 5/2003 | Bauer, Jr. | | G01R 29/0814 250/205 |
| 2005/0215268 A1* | 9/2005 | Cheng | | H04B 1/3838 455/456.1 |
| 2005/0288038 A1* | 12/2005 | Kim | | G01J 1/429 455/456.3 |
| 2007/0038402 A1* | 2/2007 | Zhang | | H05K 9/00 702/117 |
| 2007/0082621 A1* | 4/2007 | Lee | | H04W 76/021 455/69 |
| 2012/0258672 A1* | 10/2012 | Hochwald | | H04B 7/0617 455/67.14 |
| 2014/0274190 A1* | 9/2014 | Lu | | H04W 52/367 455/522 |
| 2015/0105031 A1* | 4/2015 | Colombi | | H04B 1/3838 455/73 |

\* cited by examiner

FIG. 8

| Frequency (MHz) | Thin body | Normal body | Obese body |
|---|---|---|---|
| 20 | 6.995971 | 5.812935 | 4.524994 |
| 30 | 13.2088 | 11.29298 | 9.045756 |
| 40 | 25.82458 | 22.16213 | 17.78075 |
| 50 | 38.69884 | 33.60659 | 27.34029 |
| 60 | 50.98296 | 45.03215 | 37.44215 |
| 70 | 65.74031 | 59.19366 | 50.38792 |
| 80 | 85.43604 | 78.29222 | 68.0696 |
| 90 | 108.4574 | 100.3402 | 88.03476 |
| 100 | 127.1412 | 117.297 | 102.0589 |
| 110 | 135.9078 | 123.7908 | 105.606 |
| 120 | 132.6893 | 118.5783 | 98.70329 |
| 130 | 121.0984 | 106.0306 | 86.25002 |
| 140 | 106.5536 | 91.85443 | 73.68511 |
| 150 | 92.5251 | 79.19456 | 63.52827 |
| 160 | 80.12942 | 68.67311 | 55.60381 |
| 180 | 61.45303 | 53.54625 | 44.68445 |
| 200 | 50.36075 | 45.03738 | 38.70658 |
| 220 | 44.72786 | 40.93922 | 35.77395 |
| 250 | 41.25616 | 38.1709 | 33.2576 |
| 300 | 41.18076 | 37.51002 | 32.24933 |
| 400 | 34.79142 | 31.88432 | 27.7929 |
| 600 | 31.58896 | 29.4435 | 26.95077 |
| 900 | 31.90024 | 29.7268 | 26.32408 |
| 1400 | 29.56479 | 27.81472 | 24.89947 |
| 1800 | 29.03945 | 26.93881 | 24.00955 |
| 2450 | 27.28632 | 24.99765 | 21.7369 |
| 3000 | 25.20563 | 22.82093 | 19.52164 |

METHOD OF PROVIDING AMOUNT OF EXPOSURE TO ELECTROMAGNETIC WAVES AND USER TERMINAL

CROSS-REFERENCE TO RELATED APPLICATION

This application claims the benefit of Korean Patent Application No. 10-2013-0169145, filed on Dec. 31, 2013, in the Korean Intellectual Property Office, the disclosure of which is incorporated herein by reference.

BACKGROUND

1. Field of the Invention

Embodiments relate to a method of providing an amount of exposure to electromagnetic waves measured inside or outside a body of a user by analyzing signals of various wireless services, and to a user terminal.

2. Description of the Related Art

Devices using electromagnetic waves are diversified and frequently used in daily life, which causes the general public to feel convenience together with anxiety about an influence on health due to exposure to electromagnetic waves. Exaggerated reports on a biological effect on electromagnetic waves through media, for example, a TV, an Internet, and the like may bring an effect of creating suspicions and promoting anxiety, despite a large difference with an exposure situation in an actual environment.

Because electromagnetic waves of a mobile phone indicated by a specific absorption rate (SAR) are caused by a device owned by a user with the mobile phone, the user may avoid exposure to electromagnetic waves based on a user's intention by powering off the mobile phone or by keeping the mobile phone away from the user. However, electromagnetic waves radiated from neighboring mobile communication base stations or transmitting stations may constantly exist for 24 hours, regardless of the user's intention. Very frequent complaints from residents caused by installation of mobile communication base stations show mentality of the public to concern about the exposure.

In the above environment, electromagnetic waves may be generated from a wide variety of sources, for example, in-home wireless local area network (WLAN) access points (APs), mobile communication base stations, transmitting stations, and the like. However, to acquire exact information on exposure to electromagnetic waves, professional organizations have been requested to measure the exposure until now.

Smart communication devices, for example, smartphones, tablet personal computers (PCs), and the like are widespread in the country. Smart communication devices transceive communication signals over a wireless fidelity (WiFi) network and a mobile communication network, for example a second generation (2G) network, a third generation (3G) network, a long term evolution (LTE) network, and receive broadcasting signals to view digital multimedia broadcasting (DMB). An algorithm for generating information on a reception power level from a neighboring mobile communication base station, a WLAN AP, a transmitting station, and the like in a location of a user with a smart device that transceives communication signals and receives broadcasting signals, and for converting the information to a value comparable to an exposure criterion may be implemented, and may be provided to a user. Additionally, a function of transceiving communication signals over a WiFi network and a mobile communication network, or receiving broadcasting signals to view digital multimedia broadcasting (DMB) may be applied to a DMB receiver used in vehicles, other devices or equipment having an electromagnetic field reception function, and the like.

SUMMARY

An aspect of the present invention provides a user terminal and a method for providing an amount of exposure to electromagnetic waves measured inside or outside a body of a user by analyzing signals of various wireless services received by the user terminal.

According to an aspect of the present invention, there is provided a method of providing an amount of exposure to electromagnetic waves, the method including: receiving a signal of each of a plurality of wireless services; extracting a measured electric field and a reference level of electric field strength from a signal associated with each of the plurality of wireless services; and determining an exposure index of each of the plurality of wireless services, based on the measured electric field and the reference level of electric field, the exposure index being measured outside a body of a user.

The extracting may include extracting the measured electric field from the signal based on power of the signal and a gain of an antenna that receives the signal.

The extracting may include extracting the reference level of electric field strength for a frequency of the signal based on a human body protection standard.

The method may further include displaying at least one of a measured electric field, an exposure index, and a cumulative exposure index for a predetermined period of time for each of the plurality of wireless services.

The method may further include determining whether a total exposure index for all of the plurality of wireless services exceeds a human body protection standard.

The method may further include, when the total exposure index is determined to exceed the human body protection standard, providing a warning message regarding over-exposure to an electric field.

According to another aspect of the present invention, there is provided a method of providing an amount of exposure to electromagnetic waves, the method including: receiving a signal of each of a plurality of wireless services; extracting a measured electric field from the signal in a frequency band associated with each of the plurality of wireless services; and determining a specific absorption rate (SAR) of each of the plurality of wireless services, based on the measured electric field and user body information.

The extracting may include extracting the measured electric field from the signal based on a gain of an antenna that receives the signal and power of the signal.

The method may further include displaying at least one of an SAR of each of the plurality of wireless services and a cumulative average SAR for a predetermined period of time.

The method may further include determining whether a total SAR for all of the plurality of wireless services exceeds a human body protection standard.

The method may further include, when the total SAR is determined to exceed the human body protection standard, providing a warning message regarding over-exposure to an electric field.

According to another aspect of the present invention, there is provided a user terminal, including: a receiver to receive a signal of each of a plurality of wireless services; an extractor to extract a measured electric field and a reference level of electric field at the center frequency of a frequency band associated with each of the plurality of wireless services; and an exposure index determiner to determine an exposure index of each of the plurality of wireless services, based on the measured electric field and the reference level of electric field strength, the exposure index being measured outside a body of a user.

The extractor may extract the measured electric field from the signal based on power of the signal and a gain of an antenna that receives the signal.

The extractor may extract the reference level of electric field at the center frequency based on a human body protection standard.

The user terminal may display at least one of a measured electric field, an exposure index, and a cumulative exposure index for a predetermined period of time for each of the plurality of wireless services.

The user terminal may determine whether a total exposure index for all of the plurality of wireless services exceeds a human body protection standard. When the total exposure index is determined to exceed the human body protection standard, the user terminal may provide a warning message regarding over-exposure to an electric field.

According to another aspect of the present invention, there is provided a user terminal, including: a receiver to receive a signal of each of a plurality of wireless services; an extractor to extract a measured electric field and the reference level of electric field at the center at the center frequency of a frequency band associated with each of the plurality of wireless services; and an SAR determiner to determine an SAR of each of the plurality of wireless services, based on the measured electric field and user body information.

The extractor may extract the measured electric field from the signal based on a gain of an antenna that receives the signal and power of the signal.

The user terminal may display at least one of an SAR of each of the plurality of wireless services and a cumulative average SAR for a predetermined period of time.

The user terminal may determine whether a total SAR for all of the plurality of wireless services exceeds a human body protection standard. When the total SAR is determined to exceed the human body protection standard, the user terminal may provide a warning message regarding over-exposure to an electric field.

EFFECT

According to embodiments of the present invention, it is possible to provide an amount of exposure to electromagnetic waves measured inside or outside a body of a user by analyzing signals of various wireless services received by a user terminal.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 8 is a table of a database that stores a WBA-SAR of a user with a height of 108 centimeters (cm) according to an embodiment;

DETAILED DESCRIPTION

Figure 1:
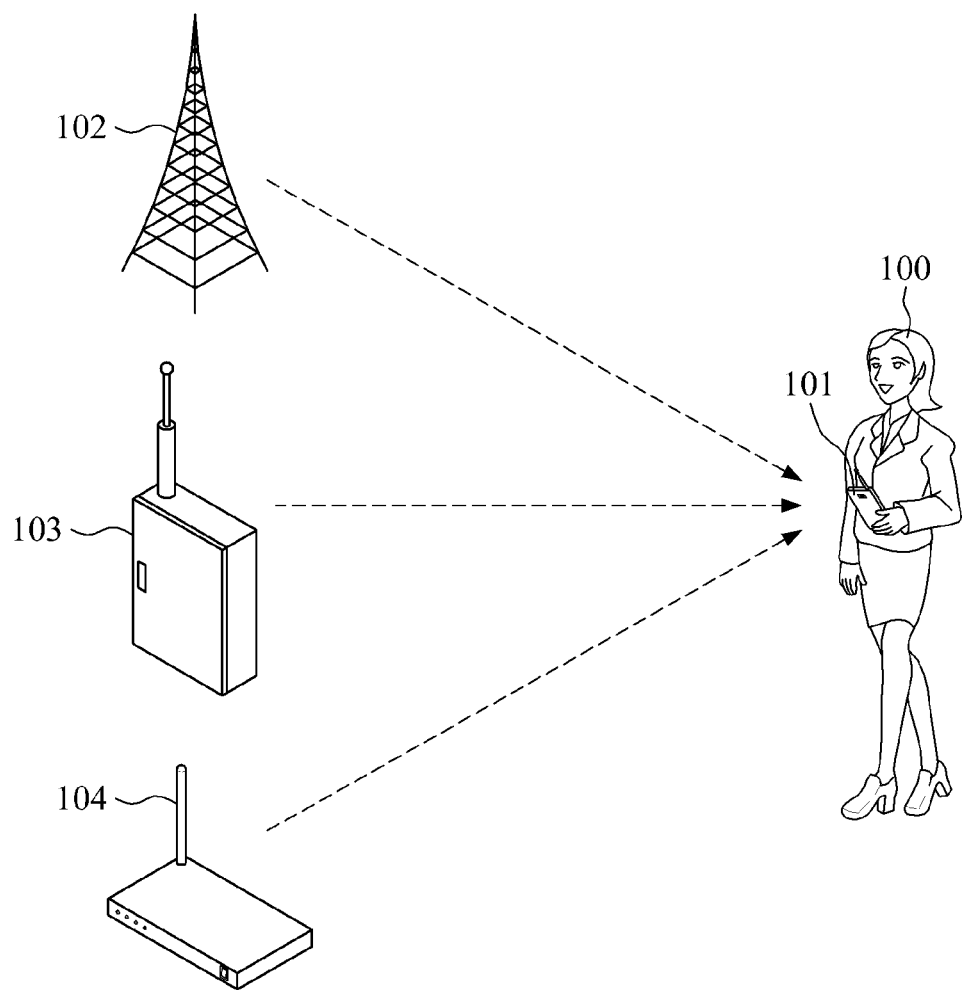
FIG. 1 is a diagram illustrating a relationship between various wireless services and a user terminal that receives signals of the various wireless services according to an embodiment.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a relationship between various wireless services and a user terminal 101 that receives signals of the various wireless services according to an embodiment.

Referring to FIG. 1, a user 100 may be provided with the various wireless services using the user terminal 101. The various wireless services may include, for example, digital multimedia broadcasting (DMB) services, third generation (3G) services, long term evolution (LTE) services, and wireless fidelity (WiFi) services. To receive the various wireless services, the user terminal 101 may receive signals associated with the various wireless services from the various wireless services. For example, when the user 100 clicks on a DMB execution icon, the user terminal 101 may receive a signal from a base station 102 to provide the user 100 with a DMB service.

Additionally, for 3G and LTE communication, the user terminal 101 may receive a signal from a corresponding base station or a relay station 103. When the user 100 desires to receive a WiFi service in home or a public place, the user terminal 101 may receive a signal from a router 104.

For providing of a service, the user terminal 101 may receive a signal of each of the various wireless services, and may extract the received signal as a power. For example, when a signal is extracted as a power, the user terminal 101 may extract an electric field based on a processed power. In this example, the extracted electric field may correspond to a measured electric field.

Additionally, the user terminal 101 may extract a reference level of electric field strength in a frequency band of the received signal. For example, the user terminal 101 may store reference level of electric field strength values for each frequency in advance, using a database, and may extract a reference level of electric field strength corresponding to a frequency of the received signal using the database.

When a measured electric field and a reference level of electric field strength are extracted, the user terminal 101 may provide the user 100 with an exposure index and an in-vivo exposure index. The in-vivo exposure index may be extracted based on a specific absorption rate (SAR). The SAR may refer to an electromagnetic wave absorption power per unit mass that is absorbed by a human body in a radio frequency (RF) band.

The user terminal 101 may extract the exposure index based on the measured electric field and the reference level of electric field strength, and may provide the user 100 with the exposure index for comparison to a human body protection standard. For example, the user terminal 101 may provide at least one of a measured electric field, an exposure index, and a cumulative exposure index for a predetermined period of time for each of a plurality of wireless services, for comparison to the human body protection standard. Accordingly, the user terminal 101 may provide a service enabling the user 100 to conveniently verify a state.

In addition, the user terminal 101 may determine whether a total exposure index for all of the plurality of wireless services exceeds the human body protection standard. When the total exposure index is determined to exceed the human body protection standard, the user terminal 101 may provide a warning message regarding over-exposure to an electric field.

To provide the user 100 with the in-vivo exposure index, the user terminal 101 may extract an SAR. The SAR may be determined based on a frequency of a received signal of the user 100, body information of the user 100, and a location of the user 100. Accordingly, the user terminal 101 may store a change in the SAR based on the body information, a signal frequency, and a posture of the user 100, in advance using a database. The SAR may refer to an in-vivo electromagnetic wave absorption rate and accordingly, the SAR may be changed based on the body information of the user 100.

For example, the SAR may be changed based on a height, an age, and a weight of the user 100. Additionally, the SAR may be changed based on whether a part of the body of the user 100 is in contact with the ground. The SAR may also be changed based on whether the user 100 is sitting or standing. Since the SAR may be changed based on the body information of the user 100, the signal frequency, and the posture of the user 100, the SAR may be stored in advance using the database. The user terminal 101 may extract an SAR corresponding to the body information, the signal frequency, and the posture of the user 100 using the database.

The user terminal 101 may extract an SAR based on a measured electric field extracted from a signal frequency and the body information received from the user 100, using the database.

The user terminal 101 may provide the user 100 with at least one of an SAR of each of the plurality of wireless services, a cumulative average SAR for a predetermined period of time, and the in-vivo exposure index. Additionally, the user terminal 101 may provide the human body protection standard using the database, to provide a service enabling the user 100 to conveniently verify a state.

When an SAR or an exposure index of the user 100 exceeds the human body protection standard, the user terminal 101 may provide the user 100 with a warning message. For example, when an in-vivo exposure index or an SAR exceeds the human body protection standard, the user terminal 101 may provide the user 100 with a warning message regarding over-exposure to an electric field, and may alert the user 100 to the over-exposure.

For example, when the human body protection standard is set to "1," and when the exposure index of the user 100 exceeds "1," the user terminal 101 may provide a message stating "You've been over-exposed to an electric field. Please pay attention to health" through sound or a pop-up window on a screen of the user terminal 110.

The user terminal 101 may provide a measured electric field, an exposure index, an SAR, and an in-vivo exposure index of each of wireless services, by using a graph or by visualization in three-dimension (3D). Additionally, the user terminal 101 may provide the measured electric field, the exposure index, the SAR, and the in-vivo exposure index, for comparison to the human body protection standard.

For example, the user terminal 101 may represent a body in 3D, and may display a 3D body representation to the user. In this example, by displaying the body in different colors, the user terminal 101 may provide information on an amount of exposure of the user 100 to electromagnetic waves. The user terminal 101 may display a safe level of exposure of the user 100 to electromagnetic waves in green, display a level in which caution is required in orange, and display a risk level in red. When the amount of exposure of the user 100 to electromagnetic waves exceeds the human body protection standard, the user terminal 101 may process a 3D representation of the body in red, and may provide the red 3D representation on the screen.

Figure 2:
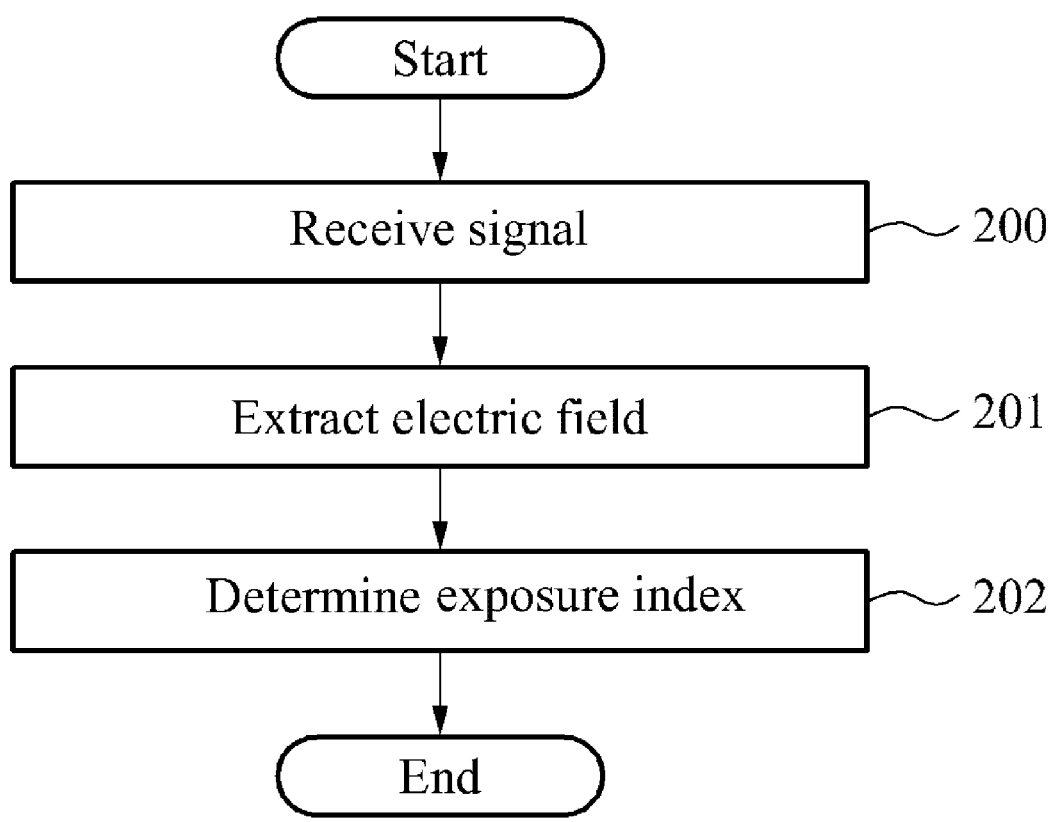
FIG. 2 is a flowchart illustrating a method of providing an amount of exposure to electromagnetic waves performed by a user terminal to provide an exposure index outside the human body according to an embodiment.

FIG. 2 is a flowchart illustrating a method of providing an amount of exposure to electromagnetic waves performed by a user terminal to provide an exposure index outside the human body according to an embodiment.

Referring to FIG. 2, in operation 200, the user terminal may receive a signal from each of a plurality of wireless services. The plurality of wireless services may include all of various wireless services provided to the user terminal, for example, a DMB service, a wideband code division multiple access (WCDMA) service, an LTE service, an LTE advanced (LTE-A) service, a WiFi service, and the like.

Frequency bands of the plurality of wireless services may be different from each other. Accordingly, the user terminal may receive signals individually for each of frequency bands, and may individually extract power of the received signal.

When a signal is received from each of the plurality of wireless services, the user terminal may extract an electric field based on the received signal in operation 201, and may additionally extract a reference level of electric field strength.

A measured electric field may refer to an electric field formed outside a body of a user, and may vary depending on occasions. For example, the user terminal may extract the measured electric field, based on power of a received signal, a gain of an antenna of the user terminal, and an intermediate frequency of a frequency band of the received signal. When signals are being received individually for each frequency band, power of received signals may be extracted.

The reference level of electric field strength may refer to an electric field formed outside the body of the user in a human body protection standard for each frequency, and may be changed based on a frequency. To extract the reference level of electric field strength, the user terminal may establish, in advance, a database for reference level of electric field strengths for each frequency. Accordingly, the user terminal may extract a reference level of electric field strength from the database, using the intermediate frequency of the frequency band of the received signal.

When the measured electric field and the reference level of electric field strength are extracted, the user terminal may determine an exposure index of each of the plurality of wireless services based on the measured electric field and the reference level of electric field strength in operation 202.

The user terminal may provide the user with at least one of a measured electric field, an exposure index, and a cumulative exposure index for a predetermined period of time for each of the plurality of wireless services. In an example, the user terminal may provide the user with an exposure index determined for each of the wireless services, or the cumulative exposure index. In this example, the user terminal may also provide an exposure index or a reference level of electric field strength based on the human body protection standard, for comparison to the human body protection standard. In another example, the user terminal may provide the user with a measured electric field extracted for each of the wireless services. In this example, the user terminal may provide a reference level of electric field strength together with the measured electric field, to compare the measured electric field to the reference level of electric field strength.

Additionally, the user terminal may determine whether a total exposure index for all of the plurality of wireless services exceeds the human body protection standard. When the total exposure index is determined to exceed the human body protection standard, the user terminal may provide the user with a warning message regarding over exposure to an electric field. The warning message may be provided, for example, through a pop-up window or sound.

Figure 3:
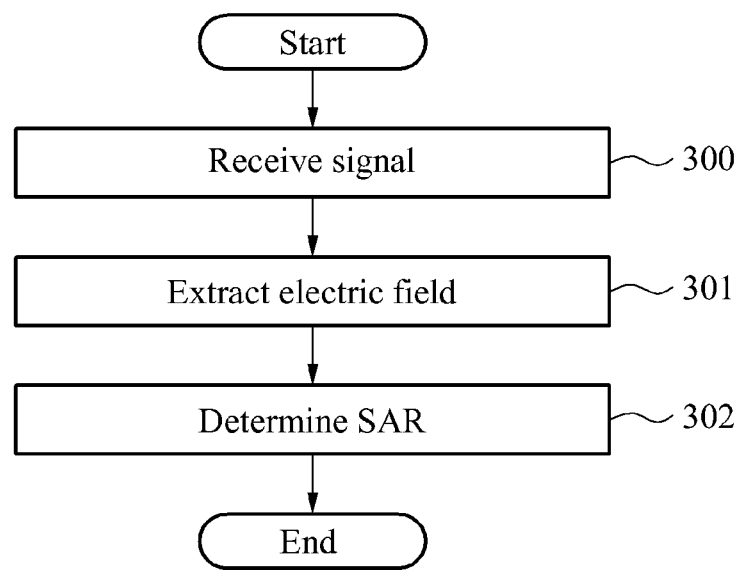
FIG. 3 is a flowchart illustrating a method of providing an amount of absorption in the human body exposed to electromagnetic waves performed by a user terminal according to an embodiment.

FIG. 3 is a flowchart illustrating a method of providing an amount of absorption in the human body exposed to electromagnetic waves performed by a user terminal according to an embodiment.

Referring to FIG. 3, in operation 300, the user terminal may receive a signal of each of a plurality of wireless services. The plurality of wireless services may include all of various wireless services provided to the user terminal, for example, a DMB service, a WCDMA service, an LTE service, an LTE-A service, a WiFi service, and the like.

For example, frequency bands of the plurality of wireless services may be different from each other. Accordingly, the user terminal may receive signals individually for each of frequency bands, and may individually extract a power for the received signal.

When a signal is received from each of various wireless services, the user terminal may extract an electric field based on the received signal in operation 301. A measured electric field may refer to an electric field formed outside a body of a user, and may vary depending on occasions. For example, the user terminal may extract the measured electric field, based on power of a received signal, a gain of an antenna that receives the signal, and a frequency band of the received signal.

When the measured electric field is extracted, the user terminal may determine an SAR of each of the plurality of wireless services based on the measured electric field and user body information in operation 302. The SAR may refer to an electromagnetic wave absorption rate, that is, an electromagnetic wave absorption power per unit mass that is absorbed by a human body in an RF band. Additionally, the user terminal may extract an in-vivo exposure index based on the determined SAR.

The SAR may be changed based on a frequency of a signal received by the user terminal, body information and a location of the user. Accordingly, the user terminal may store, in advance, an SAR based on the body information, a signal frequency, the location of the user, using a database. The user terminal may determine an SAR based on user body information received from the user, and an extracted measured electric field. The user body information may include, for example, a height, a weight, and the like of the user, and whether the user is in contact with the ground.

For example, the user terminal may determine an SAR corresponding to the user body information and the extracted measured electric field, using the database. Additionally, the user terminal may extract an in-vivo exposure index based on the SAR, and may provide the user with the extracted in-vivo exposure index.

In association with an SAR providing method, the user terminal may provide the user with at least one of an SAR of each of the plurality of wireless services and a cumulative average SAR for a predetermined period of time. In addition, the user terminal may also provide an SAR based on the human body protection standard.

In association with an exposure index providing method, the user terminal may provide the user with at least one of an in-vivo exposure index of each of the plurality of wireless services, a total exposure index obtained by adding up exposure indices of the plurality of wireless services, and a cumulative average exposure index for a predetermined period of time. In addition, the user terminal may also provide an exposure index based on the human body protection standard.

The user terminal may determine whether a total SAR for all of the plurality of wireless services exceeds the human body protection standard. When the total SAR is determined to exceed the human body protection standard, the user terminal may provide a warning message regarding over-exposure to an electric field.

Figure 4:
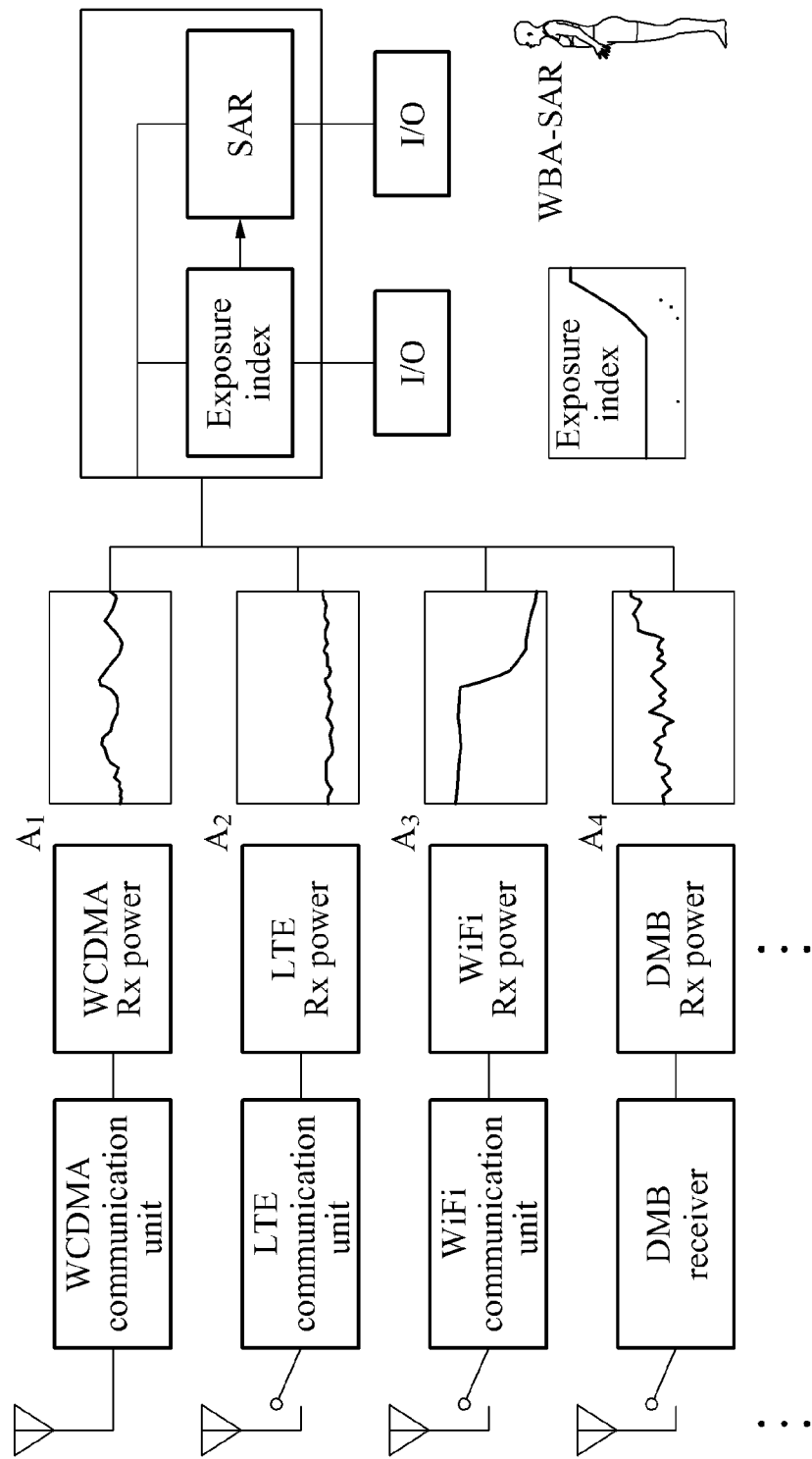
FIG. 4 is a diagram illustrating a process of receiving signals of various wireless services and of individually processing the signals according to an embodiment.

FIG. 4 is a diagram illustrating a process of receiving signals of various wireless services and of individually processing the signals according to an embodiment.

Referring to FIG. 4, a plurality of wireless services may be provided to users. Accordingly, the plurality of wireless services may have different functions and different frequency bands. For example, an LTE service, a WiFi service, a 3G service, and a DMB service may have different functions and different frequency bands. When a user desires to use a specific service, a user terminal may not be affected by another service, and may individually receive signals. For example, a user may select a WiFi service using a user terminal while using a 3G service and accordingly, the WiFi service may be provided to the user terminal. When a user selects a WiFi service, a user terminal may receive a frequency band signal of the WiFi service in real time.

When a signal of each of the plurality of wireless services is received, the user terminal may extract a power based on the received signal. When the power is extracted, the user terminal may extract a measured electric field based on the power, a frequency of the received signal, and a gain of an antenna of the user terminal. Additionally, the user terminal may extract a reference level of electric field strength corresponding to the frequency of the received signal through a database. The reference level of electric field strength may refer to an electric field determined based on a human body protection standard in a frequency band of the received signal.

The measured electric field may refer to an electric field formed outside a body of a user. The user terminal may extract a measured electric field based on a power of a signal, a frequency of the signal, and a gain of an antenna that receives the signal. For example, the measured electric field may be extracted using $E_m(t) = 10^{[A_m(t)-G_m+20\ log(f(m))-42.78]/20}$. $E_m(t)$ may denote a measured electric field in an m-th signal, and $A_m(t)$ may denote a power of the m-th signal.

Additionally, $G_m$ may denote a gain of an antenna that receives the m-th signal. The user terminal may receive a signal of each of the plurality of wireless services using a plurality of antennas. For example, the user terminal may receive a signal of a WCDMA service and a signal of an LTE service using a single antenna. However, an antenna used to receive a signal of a WiFi service may be different from the antenna used to receive the signal of the WCDMA and the signal of the LTE service. Additionally, different gains may be obtained based on a reception frequency, despite the same antenna being used. Accordingly, to extract a measured electric field, the user terminal may use a gain of an antenna individually for each signal.

Additionally, f(m) may denote an intermediate frequency of a frequency band of the m-th signal.

For example, when a WCDMA service, an LTE service, a WiFi service, and a DMB service are simultaneously provided, the user terminal may receive signals individually for each of the WCDMA service, the LTE service, the WiFi service, and the DMB service. An intermediate frequency of a signal of the WCDMA service, an intermediate frequency of a signal of the LTE service, an intermediate frequency of a signal of the WiFi service, and an intermediate frequency of a signal of the DMB service may respectively correspond to f(1), f(2), f(3), and f(4). Additionally, power of the signal of the WCDMA service, power of the signal of the LTE service, power of the signal of the WiFi service, and power of the signal of the DMB service may respectively correspond to $A_{(1)}(t)$, $A_{(2)}(t)$, $A_{(3)}(t)$, and $A_{(4)}(t)$.

A measured electric field for the WCDMA service may correspond to $E_1(t)=10^{[A_1(t)-G_1+20\ log(f(1))-42.78]/20}$, and a measured electric field for the LTE service may correspond to $E_2(t)=10^{[A_2(t)-G_2+20\ log(f(2))-42.78]/20}$. Additionally, a measured electric field for the WiFi service may correspond to $E_3(t)=10^{[A_3(t)-G_3+20\ log(f(3))-42.78]/20}$, and a measured electric field for the DMB service may correspond to $E_4(t)=10^{[A_4(t)-G_4+20\ log(f(4))-42.78]/20}$.

When a measured electric field and a reference level of electric field strength are extracted, the user terminal may provide an exposure index of each of the plurality of wireless services based on the measured electric field and the reference level of electric field strength. The user terminal may provide at least one of a measured electric field, an exposure index, and a cumulative exposure index for a predetermined period of time for each of the plurality of wireless services. Additionally, the user terminal may also provide a human body protection standard, for comparison to the human body protection standard.

For example, the user terminal may provide, using a graph, at least one of a measured electric field, an exposure index, and a cumulative exposure index for a predetermined period of time for each of the plurality of wireless services. In this example, the user terminal may also provide the human body protection standard.

When a measured electric field is extracted, the user terminal may provide an SAR for each of the plurality of wireless services based on user body information and the measured electric field. The SAR may refer to an electromagnetic wave absorption rate, and may indicate, for example, an electromagnetic wave absorption power per unit mass that is absorbed by a human body when a mobile phone is used. Since the SAR refers to an electromagnetic wave absorption rate at which electromagnetic waves are absorbed by a body of a user, the SAR may be changed based on body information of the user.

Accordingly, the user terminal may extract an SAR of each of wireless services based on user body information received from a user, together with a measured electric field. Additionally, at least one of an SAR of each of the plurality of wireless services and a cumulative average SAR for a predetermined period of time may be provided to a user. For example, the user terminal may provide at least one of an SAR of each of the plurality of wireless services and the cumulative average SAR, by using a graph, or by 3D graphics processing. The user terminal may also provide an SAR in the human body protection standard together with the cumulative average SAR.

For example, the user terminal may represent a body in 3D, and may display a 3D body representation to the user. In this example, by displaying the body in different colors, the user terminal may provide information on an amount of exposure of the user to electromagnetic waves. The user terminal may display a safe level of exposure of the user to electromagnetic waves in green, display a level in which caution is required in orange, and display a risk level in red. When the exposure of the user to electromagnetic waves exceeds the human body protection standard, the user terminal may process a 3D representation of the body in red, and may provide the red 3D representation on the screen.

Figure 5:
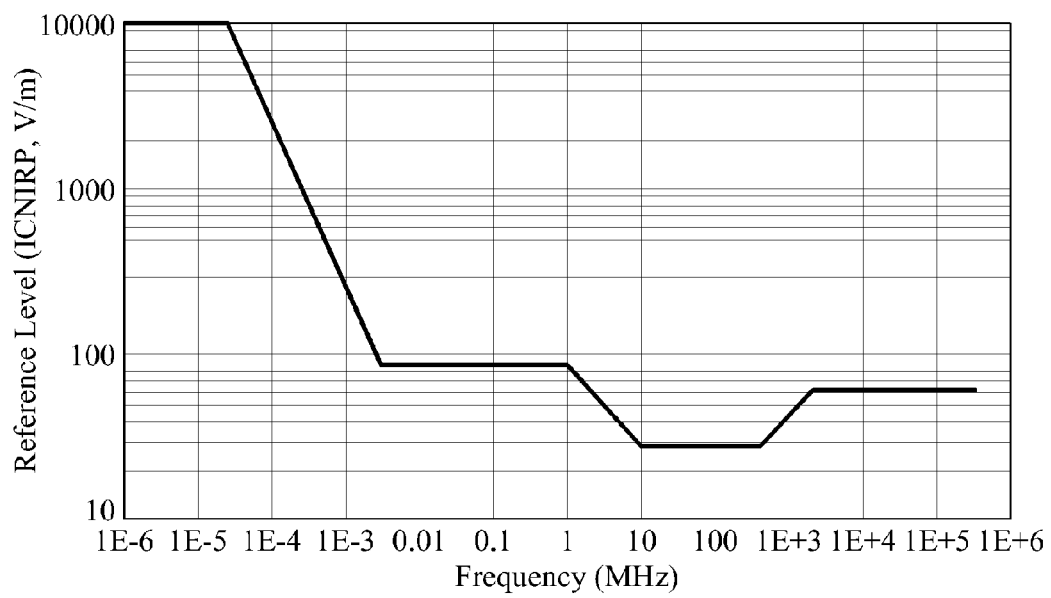
FIG. 5 is a graph showing a change in a reference level of electric field for each frequency band according to an embodiment.

FIG. 5 is a graph showing a change in a reference level of electric field for each frequency band according to an embodiment.

Referring to FIG. 5, a reference level may refer to a reference level of electric field strength, and the reference level of electric field strength may refer to an electric field for each frequency based on a human body protection standard. To compute an exact exposure index, a reference level of electric field strength corresponding to each frequency may need to be used, because the reference level of electric field strength may be changed for each frequency.

By analyzing the graph of FIG. 5, based on a change in a frequency, a reference level of electric field strength may be changed, and the frequency and the reference level of electric field strength may not be proportional to each other. The user terminal may store, in advance, reference level of electric field strengths for each frequency, using a database. Accordingly, the user terminal may extract a reference level of electric field strength corresponding to a frequency of a signal of each of a plurality of wireless services.

When a reference level of electric field strength is extracted, the user terminal may determine an exposure index based on the extracted reference level of electric field strength and a measured electric field extracted from a received signal. When the exposure index is determined, the user terminal may provide a user with at least one of a measured electric field, an exposure index, and a cumulative exposure index for a predetermined period of time for each of the plurality of wireless services. The user terminal may also provide a human body protection standard. The human body protection standard may be provided based on the extracted reference level of electric field strength. For example, when a measured electric field is provided, the user terminal may display, using a graph, a measured electric field of each of the plurality of wireless services. In this example, the user terminal may also provide a reference level of electric field strength of each of the plurality of wireless services.

Figure 6:
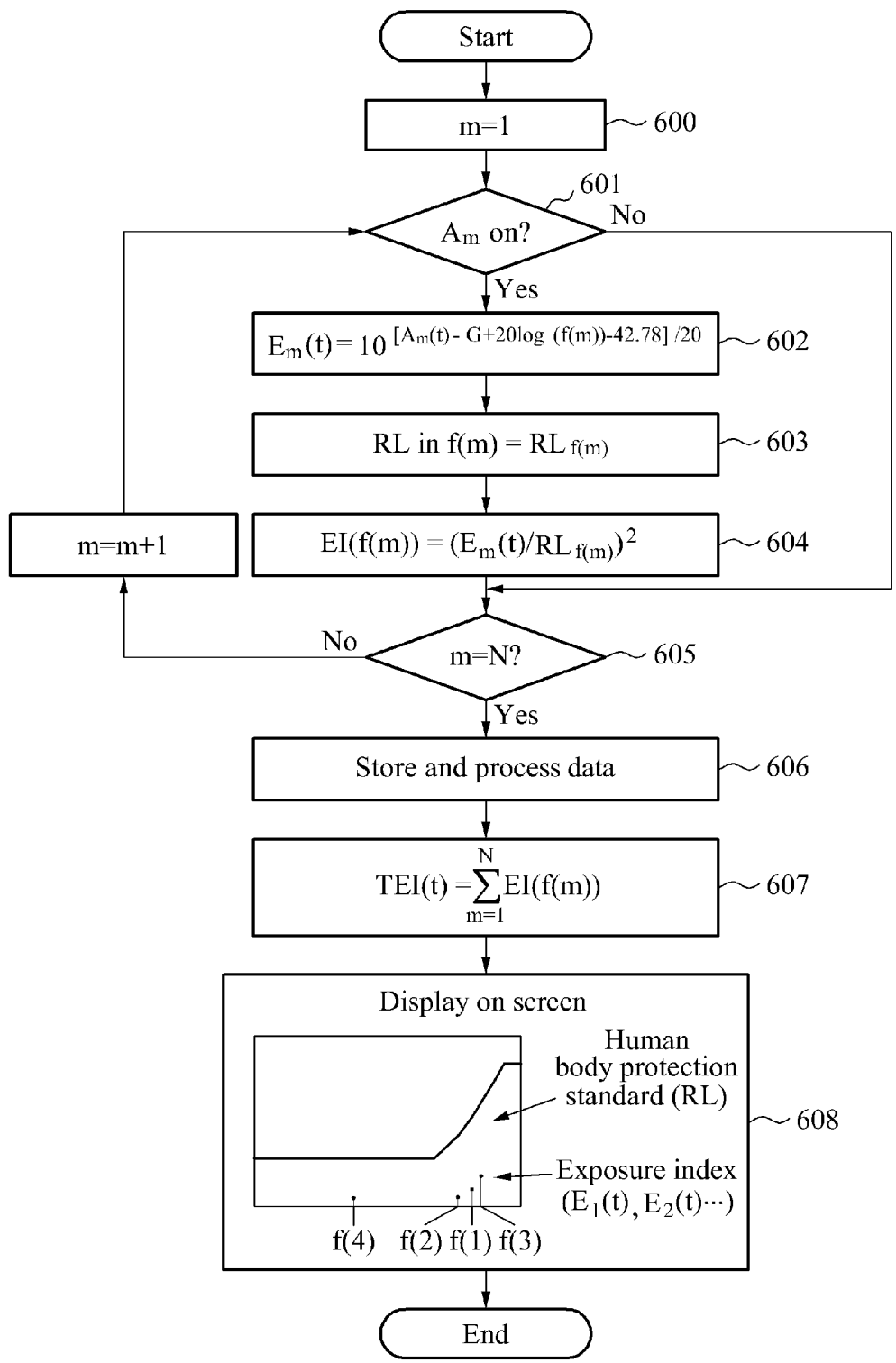
FIG. 6 is a flowchart illustrating a method of providing an exposure index outside the body according to an embodiment.

FIG. 6 is a flowchart illustrating a method of providing an exposure index outside the body according to an embodiment.

Referring to FIG. 6, when a signal of each of a plurality of wireless services is received, a user terminal may assign a number to a signal in a reception order of signals in operation 600. For example, "m=1" may be assigned to a first received signal, and "m=N" may be assigned to an N-th received signal. When a signal is received from each of the plurality of wireless services, the user terminal may extract a power of the received signal in operation 601. The user terminal may extract the received signal in a power unit, and the extracted power may be represented by $A_m(t)$ in decibels above 1 milliwatt (dBm).

For example, when signals are received from two wireless services until t seconds (s) elapse, a first received signal between the signals may correspond to "m=1," and a power of the first received signal may correspond to $A_{(1)}(t)$. Additionally, a second received signal may correspond to "m=2," and a power of the second received signal may correspond to $A_{(2)}(t)$.

When reception of the signal is verified, the user terminal may extract a measured electric field of the signal in operation 602. A measured electric field of an m-th signal may be designated as $E_m(t)$ in volt per meter (V/m). For example, the measured electric field may be represented by $E_m(t) = 10^{[A_m(t) - G_m + 20\ log(f(m)) - 42.78]/20}$. $G_m$ may denote a gain of an antenna that receives the m-th signal, in decibel (dB), and f(m) may denote a frequency of the m-th signal, in megahertz (MHz).

For example, a measured electric field of a first signal may be represented by $E_1(t) = 10^{[A_1(t) - G_1 + 20\ log(f(1)) - 42.78]/20}$.

When the measured electric field is extracted, the user terminal may obtain a reference level of electric field strength using an intermediate frequency of a frequency band of the received signal in operation 603. Referring to FIG. 6, RL may indicate a reference level of electric field strength, and $RL_{f(m)}$ may denote a reference level of electric field strength in an intermediate frequency of a frequency band of the m-th signal. For example, the user terminal may extract the reference level of electric field strength in an intermediate frequency of a frequency band of the m-th signal using a database.

When the reference level of electric field strength is extracted, the user terminal may extract an exposure index of each of received signals in operation 604. For example, the user terminal may extract an exposure index based on a ratio of a measured electric field and a reference level of electric field strength. In FIG. 6, EI may represent an exposure index, for example, an exposure index and accordingly, EI(f(m)) may indicate an exposure index in a frequency of the m-th signal.

the user terminal may extract all reference level of electric field strengths and all measured electric fields for a first signal to an N-th signal in operation 605. Additionally, the user terminal may extract an exposure index of each of the plurality of wireless services based on the extracted reference level of electric field strengths and the extracted measured electric fields.

For example, when N wireless services are provided, N signals corresponding to the N wireless services may occupy different frequency bands. The user terminal may extract a reference level of electric field strength and a measured electric field of each of the N signals. Additionally, the user terminal may extract an exposure index of each of the N signals based on the extracted reference level of electric field strength and the extracted measured electric field.

When an exposure index of an N-th signal is extracted, the user terminal may store and process data associated with received power, a reference level of electric field strength, a measured electric field, and an exposure index for the N-th signal in operation 606. The user terminal may provide the user with information based on the stored data.

The user terminal may provide at least one of a measured electric field, an exposure index, and a cumulative exposure index for a predetermined period of time for each of the plurality of wireless services. For example, the user terminal may provide a measured electric field of each of wireless services, using a graph, together with the human body protection standard. In this example, the user terminal may store and process data extracted using a database, to provide the user with the graph.

A per-signal electric field may be processed in graphics and provided, may be provided using a graph, or may be provided for comparison to the human body protection standard. Additionally, the user terminal may process an exposure index in graphics for each signal, or may provide the exposure index using a graph. For comparison to the human body protection standard, the exposure index may be processed in graphics, or provided using a graph. Furthermore, the user terminal may process in graphics a cumulative exposure index for a predetermined period of time, may provide, using a graph, the cumulative exposure index, or may provide the cumulative exposure index human for comparison to the body protection standard. Accordingly, the user terminal may store and process data associated with the extracted reference level of electric field strength and the extracted measured electric field.

In operation 607, the user terminal may add up all exposure indices of N signals. A total exposure index at a time t may be denoted by TEI(t). Additionally, TEI(t) may be represented by $$TEI(t) = \sum_{m=1}^{N} EI(f(m)).$$

In other words, a total exposure index obtained by adding up all the exposure indices of the N signals may indicate all electromagnetic waves to which the user is exposed.

For example, the user terminal may provide the user with at least one of a measured electric field, an exposure index, and a cumulative exposure index for a predetermined period of time for each of the plurality of wireless services. In operation 608, exposure indices for each signal compared to a human body protection standard may be displayed on a screen of the user terminal.

For example, when the total exposure index exceeds the human body protection standard, the user terminal may provide the user with a warning message regarding over-exposure to an electric field.

Figure 7:
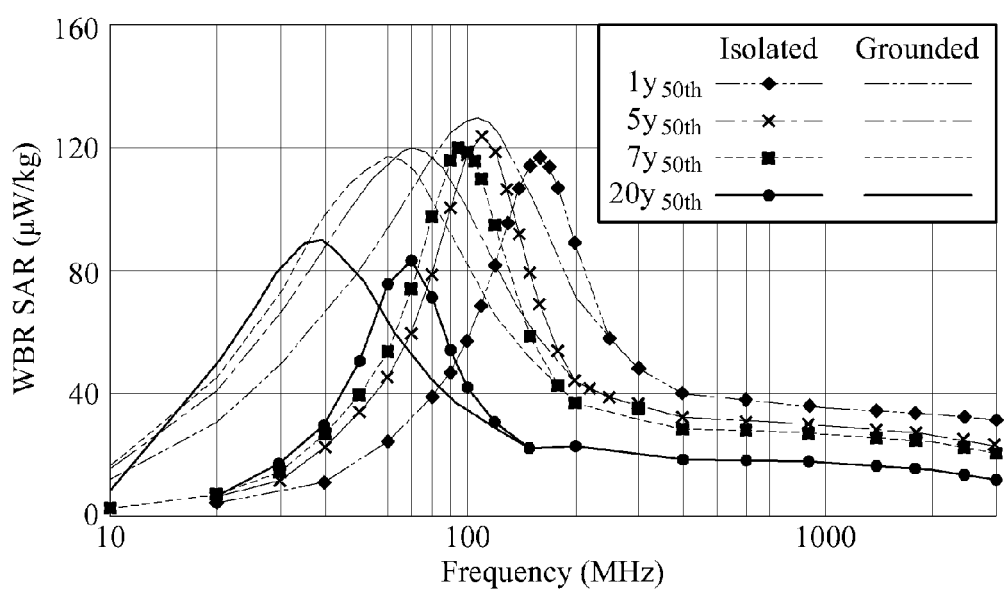
FIG. 7 is a graph showing a change in a whole-body averaged SAR (WBA-SAR) based on an age of a user and whether the user is in contact with the ground when an electric field intensity is set to 1 volt per meter (V/m) according to an embodiment of the present invention.

FIG. 7 is a graph showing a change in a whole-body averaged SAR (WBA-SAR) based on an age of a user and whether the user is in contact with the ground when an electric field intensity is set to 1 volt per meter (V/m) according to an embodiment of the present invention.

Referring to FIG. 7, an SAR may be extracted using an measured electric field. For example, the SAR may be determined based on whether a body exists in free space, whether a foot is in contact with the ground, or a posture of a user.

It may be difficult to calculate an SAR directly using an expression. Accordingly, to extract an SAR, a computer program requiring a relatively long period of time of a few minutes to a few hours may be executed using a numerical analysis scheme, for example a finite-difference time-domain (FDTD) technique, based on a provided condition. The provided condition may include, for example, whether a foot of a user is in contact with the ground, a frequency, a posture and a height of the user, and the like.

Additionally, an SAR may be stored in advance in a user terminal by databasing results of paper or literatures. A user may have a wide variety of postures. For example, when the user is standing, a highest SAR may be obtained, which may provide a worst amount of exposure. To prevent a huge quantity of data from being stored in a database, a user terminal may store an SAR for a constant value of an electric field, for example 1 V/m, and may provide an SAR extracted from a measured electric field $E_m(t)$. The database may store SAR values for each frequency as text.

The user terminal may provide an average SAR for a local part of a body, and an average SAR for a whole body. For example, the user terminal may extract a WBA-SAR of a standing user based on user body information and a measured electric field, and may provide the standing user with the WBA-SAR. The WBA-SAR may refer to an electromagnetic wave absorption rate at which electromagnetic waves are absorbed by the whole body.

The user terminal may provide a WBA-SAR using WBASAR(X,f(m))=$(E_m(t))^2 \times$WBASAR(X,f(m))$_{1V/m}$. WBASAR(X,f(m)) may denote a WBA-SAR extracted based on user body information X and an m-th frequency f(m).

The user body information X may include, for example, information regarding whether a foot of a user is in contact with the ground, a posture, a height, and a weight of the user, and the like, and f(m) may denote an intermediate frequency of a frequency band of an m-th signal. Additionally, WBASAR(X,f(m))$_{1V/m}$ may denote a value of WBA-SAR corresponding to an electric field, that is, a reference level of electric field strength of 1V/m, based on the user body information X and the m-th frequency f(m), and may be databased and stored in advance.

FIG. 8 is a table of a database that stores a WBA-SAR of a user with a height of 108 centimeters (cm) according to an embodiment.

Referring to FIG. 8, the database may include WBA-SARs based on a change in a frequency, a height, and a weight. For example, a user terminal may determine an SAR based on a measured electric field and an average SAR extracted through a database.

An SAR may be changed based on a height, a weight, and a posture of a user, a frequency, whether the user is in contact with the ground, and the like. The user may have a wide variety of postures. For example, when the user is standing, a highest WBA-SAR may be obtained. Accordingly, the user terminal may store, in a database in advance, an SAR changed due to a change in a frequency, a height, and a weight, based on a state in which the user is standing and a state in which the user is in contact with the ground.

For example, a WBA-SAR may be determined using an equation WBASAR(X,f(m))=$(E_m(t))^2 \times$WBASAR(X,f(m))$_{1V/m}$. In the equation, WBASAR(X,f(m)) may denote a WBA-SAR extracted based on user body information X and an m-th frequency f(m). The user body information X may include, for example, information regarding whether a foot of a user is in contact with the ground, a posture, a weight and a height of the user, and the like. Additionally, WBASAR(X,f(m))$_{1V/m}$ may denote a WBA-SAR corresponding to a reference level of electric field strength of 1 V/m in the body information X and the m-th frequency f(m).

For example, when a user is 108 cm in height and has a thin body, and when an intermediate frequency of a frequency band of a received signal is set to 70 MHz, an average SAR may correspond to 65.74031 [μW/kg]. When a user terminal determines a WBA-SAR for a wireless service corresponding to a first received signal among wireless services, WBASAR(X,f(1)) for the first received signal may be WBASAR(X,f(1))=$(E_1(t))^2 \times 65.74031_{[\mu W/kg]}$.

Figure 9:
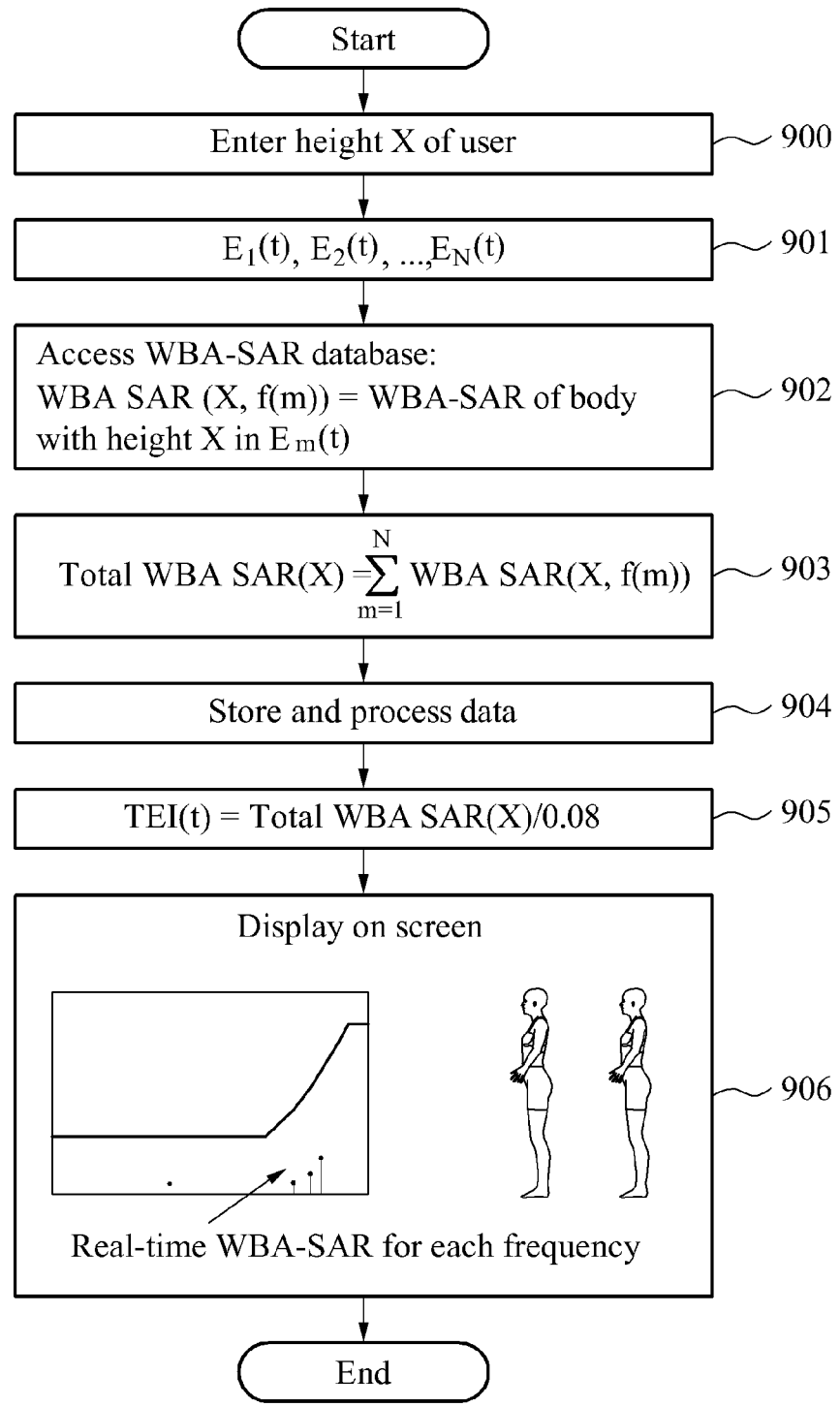
FIG. 9 is a flowchart illustrating a method of providing a WBA-SAR according to an embodiment.

FIG. 9 is a flowchart illustrating a method of providing a WBA-SAR according to an embodiment.

Referring to FIG. 9, in operation 900, a user may enter user height information, for example height information X, using a user terminal. For example, the user terminal may provide a popup message stating "Enter your height" on a screen of the user terminal. When the user clicks on the popup message, the user terminal may provide a number input keyboard on the screen. When the user enters 108 and presses an ok button, the user terminal may store the height information X as 108 cm.

When the user height information is normally input, the user terminal may extract measured electric fields in operation 901.

For example, a measured electric field of a first received signal may be designated as $E_1(t)$, and a measured electric field of an N-th received signal may be designated as $E_m(t)$.

When signals of a plurality of wireless services, for example a first signal through an N-th signal, are received, the user terminal may extract power for each of the received signals. The user terminal may extract the received signals in a power unit, and the extracted power may be designated as $A_m(t)$.

For example, when signals are received from two wireless services until t s, a first received signal between the signals may correspond to "m=1," and a power of the first received signal may correspond to $A_{(1)}(t)$. Additionally, a second received signal may correspond to "m=2," and a power of the second received signal may correspond to $A_{(2)}(t)$.

When the power is normally extracted, the user terminal may extract a measured electric field of a signal m. The measured electric field may be represented by $E_m(t) = 10^{[A_m(t)-G_m+20\ log(f(m))-42.78]/20}$. $G_m$ may denote a gain of an antenna that receives the signal m, and f(m) may denote an intermediate frequency of a frequency band of the signal m.

For example, a measured electric field of a first signal may be represented by $E_1(t) = 10^{[A_1(t)-G_1+20\ log(f(1))-42.78]/20}$.

When the measured electric fields are extracted, the user terminal may access a database, and may extract an average SAR corresponding to the user height information in operation 902. For example, the user terminal may search for the average SAR and a measured electric field from the database. When the average SAR is found, the user terminal may extract a WBA-SAR of the user based on the average SAR. The WBA-SAR may be obtained using WBASAR(X,f(m))=$(E_m(t))^2 \times$WBASAR(X,f(m))$_{1V/m}$. X may denote user height information, f(m) may denote an intermediate frequency of a frequency band of a received signal, and $E_m(t)$ may denote a measured electric field. Additionally, WBASAR(X,f(m))$_{1V/m}$ may denote a WBA-SAR in an electric field of 1V/m.

When the WBA-SAR is extracted, the user terminal may extract a total WBA-SAR for all of the received signals in operation 903. The total WBA-SAR may be affected by a specific time. The user may be affected by electromagnetic waves of all signals received from the user terminal.

In operation 904, the user terminal may store WBA-SARs extracted for each of the received signals, and the total WBA-SAR, and may process the WBA-SARs and the total WBA-SAR to provide the user with the WBA-SARs and the total WBA-SAR. For example, the user terminal may provide the user with at least one of WBA-SARs for each of the plurality of wireless services, a total WBA-SAR obtained by adding up the WBA-SARs, and a cumulative WBA-SAR for a predetermined period of time. Accordingly, to provide the cumulative WBA-SAR, the user terminal may continue to perform a process of extracting a WBA-SAR of a received signal, and storing and accumulating the WBA-SAR.

To provide the user with at least one of the WBA-SARs and the cumulative WBA-SAR, the user terminal may process in graphics at least one of the WBA-SARs and the cumulative WBA-SAR. In addition, the user terminal may provide the user with at least one of the WBA-SARs and the cumulative WBA-SAR using a graph. In this example, the user terminal may provide at least one of the WBA-SARs and the cumulative WBA-SAR, using graphics or a graph, for comparison to a human body protection standard. Accordingly, the user terminal may perform processing to provide a graph and graphics.

When operation 904 is performed, the user terminal may extract a total exposure index based on an influence of electromagnetic waves in operation 905. The total exposure index may correspond to, for example, a value obtained by dividing Total WBA-SAR(X) by "0.08." Total WBA-SAR(X) may denote a total WBA-SAR for a plurality of wireless services, "0.08" may refer to a WBA-SAR standard for Koreans, and TEI(t) may denote a total exposure index at a time t.

When the total exposure index is extracted, the user terminal may provide the user with at least one of the total exposure index, a cumulative average total exposure index, a cumulative total exposure index for a predetermined period of time, a per-service WBA-SAR, a total WBA-SAR, and a cumulative average WBA-SAR for a predetermined period of time in operation 906. For example, the user terminal may process a body of the user in 3D graphics, and may provide a current situation. Additionally, the user terminal may provide a total exposure index, a cumulative average exposure index, a cumulative per-service WBA-SAR, and a cumulative average WBA-SAR. Furthermore, the user terminal may also provide the human body protection standard, to increase understanding of the user. For example, the user terminal may display an electromagnetic wave absorption level for comparison to the human body protection standard using a 3D image representing the body, or using a bar graph.

Figure 10:
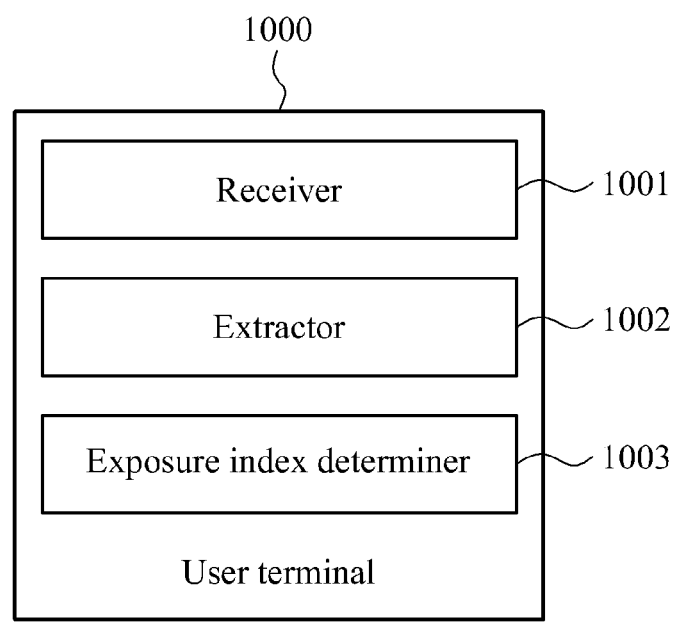
FIG. 10 is a block diagram illustrating a user terminal for performing the method of FIG. 2.

FIG. 10 is a block diagram illustrating a user terminal 1000 for performing the method of FIG. 2.

Referring to FIG. 10, a receiver 1001 may receive a signal of each of a plurality of wireless services. The plurality of wireless services may include all of various wireless services provided to the user terminal 1000, for example, a DMB service, a WCDMA service, an LTE service, an LTE-A service, a WiFi service, and the like.

Frequency bands of the plurality of wireless services may be different from each other. Accordingly, the receiver 1001 may receive signals individually for each of frequency bands, and may individually extract power of the received signal.

When a signal is received from each of the plurality of wireless services, an extractor 1002 may extract an electric field based on the received signal, and may additionally extract a reference level of electric field strength.

A measured electric field may refer to an electric field formed outside a body of a user, and may vary depending on occasions. For example, the extractor 1002 may extract the measured electric field, based on power of a received signal, a gain of an antenna of the receiver 1001, and an intermediate frequency of a frequency band of the received signal. When signals are being received individually for each frequency band, power of received signals may be extracted.

The reference level of electric field strength may refer to an electric field formed outside the body of the user in a human body protection standard for each frequency, and may be changed based on a frequency. To extract the reference level of electric field strength, the extractor 1002 may establish, in advance, a database for reference level of electric field strengths for each frequency. Accordingly, the extractor 1002 may extract a reference level of electric field strength from the database, using the intermediate frequency of the frequency band of the received signal.

When the measured electric field and the reference level of electric field strength are extracted, an exposure index determiner 1003 may determine an exposure index of each of the plurality of wireless services based on the measured electric field and the reference level of electric field strength.

The user terminal 1000 may provide the user with at least one of a measured electric field, an exposure index, and a cumulative exposure index for a predetermined period of time for each of the plurality of wireless services. In an example, the user terminal 1000 may provide the user with an exposure index determined for each of the wireless services, or the cumulative exposure index. In this example, the user terminal 1000 may also provide an exposure index or a reference level of electric field strength based on the human body protection standard, for comparison to the human body protection standard. In another example, the user terminal 1000 may provide the user with a measured electric field extracted for each of the wireless services. In this example, the user terminal 1000 may provide a reference level of electric field strength together with the measured electric field, to compare the measured electric field to the reference level of electric field strength.

Additionally, the user terminal 1000 may determine whether a total exposure index for all of the plurality of wireless services exceeds the human body protection standard. When the total exposure index is determined to exceed the human body protection standard, the user terminal 1000 may provide the user with a warning message regarding overexposure to an electric field. The warning message may be provided, for example, through a pop-up window or sound.

Figure 11:
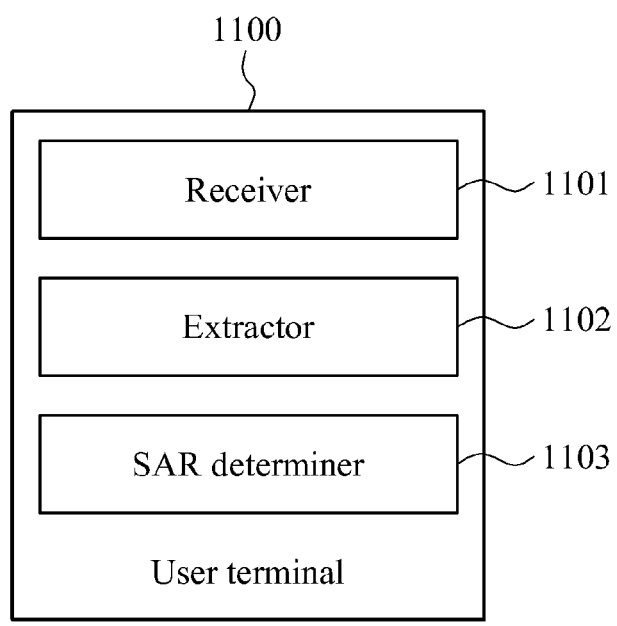
FIG. 11 is a block diagram illustrating a user terminal for performing the method of FIG. 3.

FIG. 11 is a block diagram illustrating a user terminal 1100 for performing the method of FIG. 3.

Referring to FIG. 11, a receiver 1101 may receive a signal of each of a plurality of wireless services. The plurality of wireless services may include all of various wireless services provided to the user terminal 1100, for example, a DMB service, a WCDMA service, an LTE service, an LTE-A service, a WiFi service, and the like.

For example, frequency bands of the plurality of wireless services may be different from each other. Accordingly, the receiver 1101 may receive signals individually for each of frequency bands, and may individually extract a power for the received signal.

When a signal is received from each of various wireless services, an extractor 1102 may extract an electric field based on the received signal. A measured electric field may refer to an electric field formed outside a body of a user, and may vary depending on occasions. For example, the extractor 1102 may extract the measured electric field, based on at least one of power of a received signal, a gain of an antenna that receives the signal, and an intermediate frequency of a frequency band of the received signal.

When the measured electric field is extracted, an SAR determiner 1103 may determine an SAR of each of the plurality of wireless services based on the measured electric field and user body information. The SAR may refer to an electromagnetic wave absorption rate, that is, an electromagnetic wave absorption power per unit mass that is absorbed by a human body when a mobile phone is used. Additionally, the user terminal 1100 may extract an in-vivo exposure index based on the determined SAR.

The SAR may be changed based on a frequency of a signal received by the user terminal, body information and a location of the user. Accordingly, the SAR determiner 1103 may store, in advance, an SAR based on the body information, a signal frequency, the location of the user, using a database. The SAR determiner 1103 may determine an SAR based on user body information received from the user, and an extracted measured electric field. The user body information may include, for example, a height, a weight, and the like of the user, and whether the user is in contact with the ground. For example, the SAR determiner 1103 may determine an SAR corresponding to the user body information and the extracted measured electric field, using the database. Additionally, the user terminal 1100 may extract an in-vivo exposure index based on the SAR, and may provide the user with the extracted in-vivo exposure index.

In association with an SAR providing method, the user terminal 1100 may provide the user with at least one of an SAR of each of the plurality of wireless services and a cumulative average SAR for a predetermined period of time. In addition, the user terminal 1100 may also provide an SAR based on the human body protection standard.

In association with an exposure index providing method, the user terminal 1100 may provide the user with at least one of an in-vivo exposure index of each of the plurality of wireless services, a total exposure index obtained by adding up exposure indices of the plurality of wireless services, and a cumulative average exposure index for a predetermined period of time. In addition, the user terminal 1100 may also provide an exposure index based on the human body protection standard.

The user terminal 1100 may determine whether a total SAR for all of the plurality of wireless services exceeds the human body protection standard. When the total SAR is determined to exceed the human body protection standard, the user terminal 1100 may provide a warning message regarding over-exposure to an electric field.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of providing an amount of exposure to electromagnetic waves by using a non-transitory, computer-accessible medium with a processor, the method comprising:
    receiving a signal of each of a plurality of wireless services;
    extracting a measured electric field and a reference level of electric field strength from a signal associated with each of the plurality of wireless services; and
    determining an exposure index of each of the plurality of wireless services, based on the measured electric field and the reference level of electric field strength, the exposure index being measured outside a body of a user,
    wherein the extracting comprises extracting the reference level of electric field strength using a database; and
    wherein the database stores reference level of electric field values for each of the plurality of wireless services in advance.

2. The method of claim 1, wherein the extracting comprises extracting the measured electric field from the signal based on power of the signal and a gain of an antenna that receives the signal.

3. The method of claim 1, wherein the extracting comprises extracting the reference level of electric field strength for a frequency of the signal based on a human body protection standard.

4. The method of claim 1, further comprising:
    displaying at least one of a measured electric field, an exposure index, and a cumulative exposure index for a predetermined period of time for each of the plurality of wireless services.

5. The method of claim 1, further comprising:
    determining whether a total exposure index for all of the plurality of wireless services exceeds a human body protection standard.

6. The method of claim 5, further comprising:
    when the total exposure index is determined to exceed the human body protection standard, providing a warning message regarding over-exposure to an electric field.

7. A method of providing an amount of exposure to electromagnetic waves by using a computer-accessible medium with a processor, the method comprising:
    receiving a signal of each of a plurality of wireless services;
    extracting a measured electric field from the signal in a frequency band associated with each of the plurality of wireless services; and
    determining a specific absorption rate (SAR) of each of the plurality of wireless services, based on the measured electric field and user body information,
    wherein determining comprises determining the SAR using a database; and
    wherein the database stores a change in the SAR based on the user body information in advance.

8. The method of claim 7, wherein the extracting comprises extracting the measured electric field from the signal based on a gain of an antenna that receives the signal and power of the signal.

9. The method of claim 7, further comprising:
    displaying at least one of an SAR of each of the plurality of wireless services and a cumulative average SAR for a predetermined period of time.

10. The method of claim 7, further comprising:
    determining whether a total SAR for all of the plurality of wireless services exceeds a human body protection standard.

11. The method of claim 10, further comprising:
    when the total SAR is determined to exceed the human body protection standard, providing a warning message regarding over-exposure to an electric field.

12. A user terminal, comprising:
    a receiver to receive a signal of each of a plurality of wireless services;
    an extractor to extract a measured electric field and a reference level of electric field strength from a signal associated with each of the plurality of wireless services; and
    an exposure index determiner to determine an exposure index of each of the plurality of wireless services, based on the measured electric field and the reference level of electric field strength, the exposure index being measured outside a body of a user,
    wherein the extractor extracts the reference level of electric field strength using a database; and
    wherein the database stores reference level of electric field values for each of the plurality of wireless services in advance.

13. The user terminal of claim 12, wherein the extractor extracts the measured electric field from the signal based on power of the signal and a gain of an antenna that receives the signal.

14. The user terminal of claim 12, wherein the extractor extracts the reference level of electric field strength for a frequency of the signal based on a human body protection standard.

15. The user terminal of claim 12, wherein the user terminal displays at least one of a measured electric field, an exposure index, and a cumulative exposure index for a predetermined period of time for each of the plurality of wireless services.

16. The user terminal of claim 12, wherein the user terminal determines whether a total exposure index for all of the plurality of wireless services exceeds a human body protection standard, and when the total exposure index is determined to exceed the human body protection standard, the user terminal provides a warning message regarding over-exposure to an electric field.

17. A user terminal, comprising:
- a receiver to receive a signal of each of a plurality of wireless services;
- an extractor to extract a measured electric field from the signal in a frequency band associated with each of the plurality of wireless services; and
- a specific absorption rate (SAR) determiner to determine an SAR of each of the plurality of wireless services, based on the measured electric field and user body information,
- wherein the SAR determiner determines the SAR using a database; and
- wherein the database stores a change in the SAR based on the user body information in advance.

18. The user terminal of claim 17, wherein the extractor extracts the measured electric field from the signal based on a gain of an antenna that receives the signal and power of the signal.

19. The user terminal of claim 17, wherein the user terminal displays at least one of an SAR of each of the plurality of wireless services and a cumulative average SAR for a predetermined period of time.

20. The user terminal of claim 17, wherein the user terminal determines whether a total SAR for all of the plurality of wireless services exceeds a human body protection standard, and when the total SAR is determined to exceed the human body protection standard, the user terminal provides a warning message regarding over-exposure to an electric field.

* * * * *